(12) United States Patent
Zhang et al.

(10) Patent No.: US 8,591,751 B2
(45) Date of Patent: Nov. 26, 2013

(54) VERY THIN HIGH COERCIVITY FILM AND PROCESS FOR MAKING IT

(75) Inventors: Kunliang Zhang, Fremont, CA (US); Min Zheng, Milpitas, CA (US); Min Li, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 138 days.

(21) Appl. No.: 13/200,790

(22) Filed: Sep. 30, 2011

(65) Prior Publication Data

US 2013/0084452 A1    Apr. 4, 2013

(51) Int. Cl.
*B44C 1/22*   (2006.01)

(52) U.S. Cl.
USPC .............................. 216/22; 977/888; 427/130

(58) Field of Classification Search
None
See application file for complete search history.

(56) References Cited

U.S. PATENT DOCUMENTS

| | | |
|---|---|---|
| 6,007,623 A | 12/1999 | Thiele et al. |
| 6,302,940 B2 | 10/2001 | Murray et al. |
| 2005/0264957 A1 * | 12/2005 | Li et al. ................... 360/324.12 |
| 2006/0188743 A1 | 8/2006 | Seki et al. |
| 2008/0090307 A1 * | 4/2008 | Xiao et al. ....................... 438/3 |
| 2009/0078927 A1 * | 3/2009 | Xiao et al. ....................... 257/9 |
| 2009/0274931 A1 * | 11/2009 | Qiu et al. ..................... 428/814 |
| 2010/0151275 A1 * | 6/2010 | Shin et al. ................. 428/836.1 |
| 2010/0159283 A1 * | 6/2010 | Ibusuki et al. ............... 428/829 |
| 2010/0200124 A1 * | 8/2010 | Qiu et al. ..................... 148/527 |
| 2010/0276272 A1 * | 11/2010 | Zheng et al. ............ 204/192.11 |
| 2010/0330395 A1 * | 12/2010 | Zhang et al. ................ 428/813 |
| 2011/0235217 A1 * | 9/2011 | Chen et al. ................ 360/324.2 |

* cited by examiner

*Primary Examiner* — Kevin Bernatz
(74) *Attorney, Agent, or Firm* — Saile Ackerman LLC; Stephen B. Ackerman

(57) ABSTRACT

High Hc (>4,000 Oe) and high Hk (>1 Tesla) has been achieved in FePt films as thin as 70 Angstroms. This was accomplished by starting with a relatively thick film having the required high coercivity, coating it with a suitable material such as Ta, and then using ion beam etching to remove surface material until the desired thickness was reached.

18 Claims, 5 Drawing Sheets

VERY THIN HIGH COERCIVITY FILM AND PROCESS FOR MAKING IT

FIELD OF THE INVENTION

The invention relates to the general field of magnetic thin films with particular emphasis on films that simultaneously have low thickness and high coercivity.

BACKGROUND OF THE INVENTION

Ultra-thin films with ultra-high Hc (coercivity) or Hk (uniaxial anisotropy) are needed for certain magnetic recording applications. However, material structures of this type are not readily available. Conventional hard magnetic materials such as CoPt or CoPtX (X=Cr, Ta, Ru, SiO2 etc) typically have Hc values in the 2000 to 2,500 range Oe range, which is not high enough for these special applications.

Ordered $Co_{50}Pt_{50}$ or $Fe_{50}Pt_{50}$ film structures have been used to achieve higher Hc or Hk films. However, these require a strenuous annealing treatment and a relatively thick film to form the ordered structure. To achieve a higher Hc in thinner films of this type, would demand even more strenuous annealing conditions which would create major problems for device integration.

Much effort has been expended on attempts to lower the temperature required to produce these ordered FePt films. However, none of these showed much promise until recently [1]. The present invention builds on this work and discloses a novel method for producing ultra-thin FePt films (<60 Å) having an Hc of about of 4,000 Oe or more.

It has been suggested that, in order to form an ordered structure in FePt, the FePt layer should be deposited on a Pt seed layer and then capped with a Pt capping layer. Following this, the structure needs to be annealed at a temperature in the range of from 250 to 400° C. for 4 hours or longer. In this way it has been possible to achieve a Hc of 5,000 Oe or more in FePt films 200 or more Angstroms thick. The present invention discloses how the magnetic properties of an ordered structure can be preserved in even thinner films having thicknesses less than 150 Å.

References [1] J. Qiu, et al, "hard magnet with cap and seed layers and data storage device read/write head incorporating the same", US20090274931A1

A routine search of the prior art was performed with the following references of interest being found:

In U.S. Patent Application 2009/0274931, Qiu et al. disclose depositing a FePt layer on a Pt seed layer, then a Pt cap layer, and annealing. The thin film has a thickness of <=200 Angstroms. In U.S. Patent Application 2006/0188743, Seki et al. disclose a FePt thin film<100 nm thick formed by sputtering on an undercoat layer. U.S. Pat. No. 6,007,623 (Thiele et al.) teaches forming a FePt and CoPt layer of 50 nm sputtered onto an etched (and roughened) seed layer while U.S. Patent Application 2001/0009119 (Murray et al.) teaches depositing FePt and annealing. The resulting coercivity is 500-6500 Oe. None of these references teaches both a low thickness and a high coercivity in the same film.

SUMMARY OF THE INVENTION

It has been an object of at least one embodiment of the present invention to describe a magnetic film that simultaneously possesses low thickness and high coercivity.

Another object of at least one embodiment of the present invention has been for this magnetic film to have a thickness that is no greater than 55 Å and a coercivity of at least 3680 Oe.

Still another object of at least one embodiment of the present invention has been to provide a method for the preparation of this film.

A further object of at least one embodiment of the present invention has been for said method to be easy to incorporate as part of current methods for manufacturing magneto-resistive devices These objects have been achieved through a process that begins by first depositing a relatively thick FePt film and then annealing it for an acceptable time at a moderate temperature (for example below 300° C. for less than 10 hrs) until it acquires an ordered structure having a high Hc. We then deposit an ion beam protection layer (IBPL) using a suitable material such as Ta. We follow this with the application of ion beam etching to remove surface material until a particular desired thickness is reached.

Through use of this process we have been able to form FePt films having, simultaneously a Hc in excess of 4000 Oe and a thickness as low as 50 Å.

As an alternative, the Ta protection layer deposition and the ion beam etching removal can be done in situ in an IBD system.

DESCRIPTION OF THE PREFERRED EMBODIMENTS

It is well known that magnetic ordering temperature is very sensitive to film thickness—when the film thickness is larger, a lower annealing temperature is required to form an ordered structure. Thus, when the film becomes thinner, the annealing temperature becomes much higher and the annealing time becomes much longer. For example, in order to achieve an ordered structure in a 100 Å FePt (FP) film, the annealing temperature would have to be at least 450° C. Such a high annealing temperature cannot be tolerated for most device applications.

To overcome this problem the possibility of using an etch-back process was investigated. First, several relatively thick FePt film samples were annealed in the usual manner until they formed well ordered structures capable of acting as high Hc FePt films. An etch-back process, such as low energy ion-beam sputter etching, was then initiated to reduce the thickness of the initial FePt film. As will become apparent below, this work yielded some very unexpected results related to the specifics of how the etch back process was performed.

Figure 1:
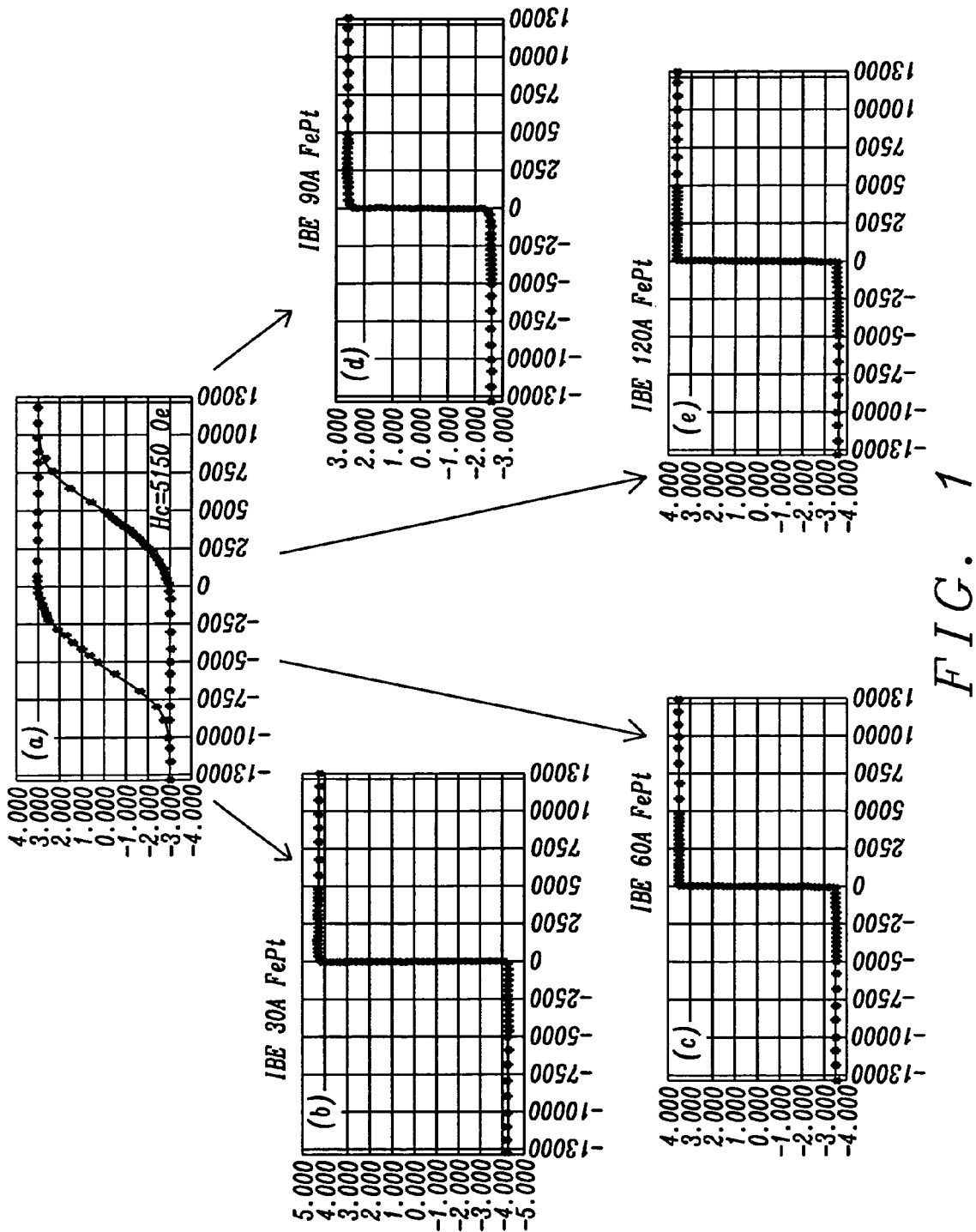
FIG. 1 shows how even a small amount of etch-back of a 200 Å FePt film reduces its coercivity to zero.

Work began with the Sample 1 structure (Pt20/FP200/Pt20) since it offered the best initial Hc (5150 Oe after deposition and annealing). The outcome following the next step turned out to be very sensitive to the specifics of the ion beam etching:

Following even a very slight etch, the Hc of Sample 1 (x-axis value when y-axis value is zero) was found, surprisingly, to have been reduced to zero. This is reflected in the data shown in FIG. 1:

FIG. 1(a) shows the MH curve for Sample 1 after 280° C./6 h anneal and prior to any etch-back. FIGS. 1(b) through 1(e) are MH curves for Sample 1 after removal of 30 Å, 60 Å, 90 Å, and 120 Å of FePt, respectively.

For the record, we note here that, as a matter of routine following completion of the etch-back process, a 50 Å Ta capping layer was applied to protect the sample from oxidation during subsequent handling.

Figure 2:
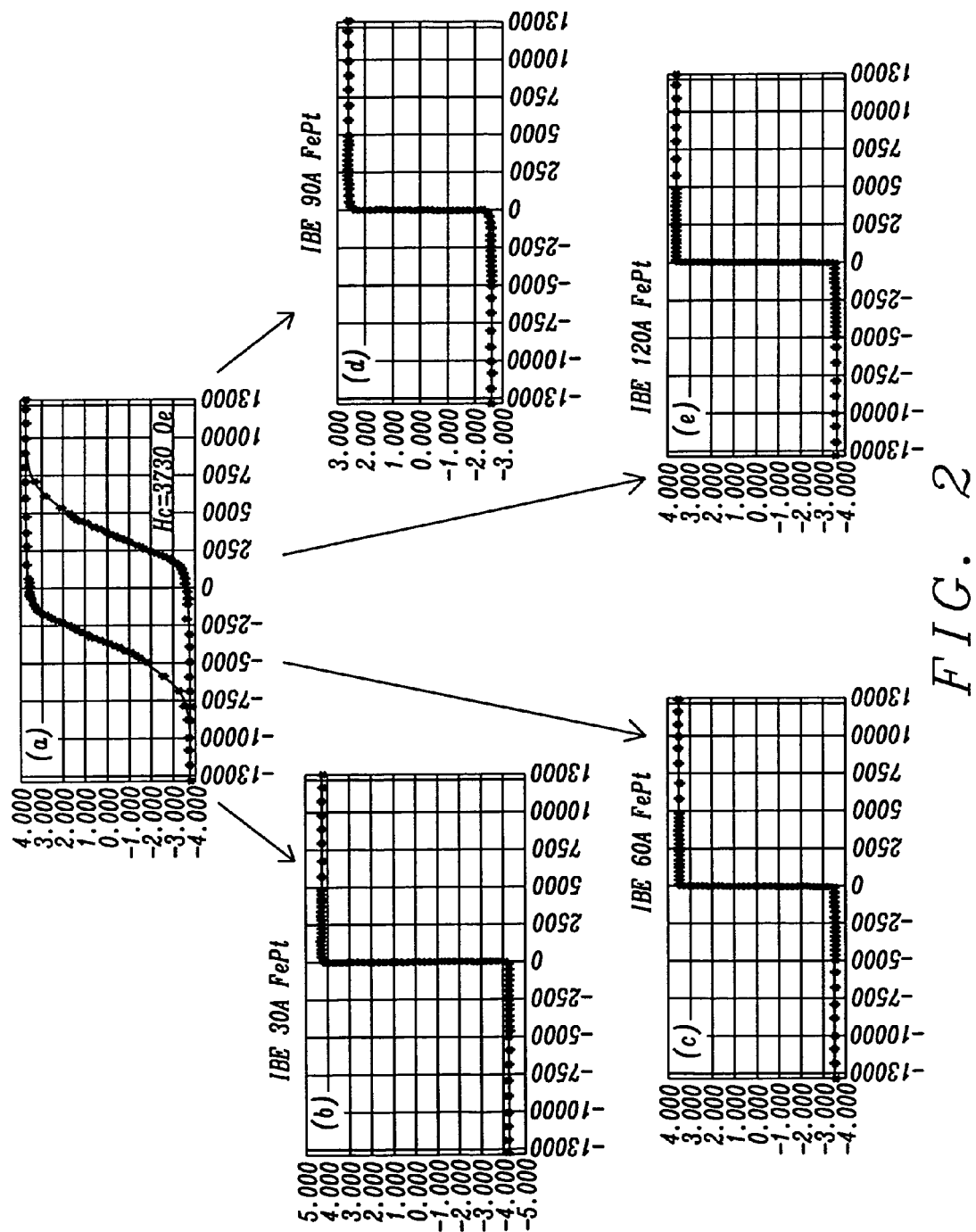
FIG. 2 shows results similar to FIG. 1 for a FePt film that was protected with 40 Å of Ru prior to starting etch-back.

Tests were then performed on the Sample 2 structure (Pt20/FePt200/Pt20/Ru40), which included a 40 Å Ru cap on top of the existing Pt capping layer. Although adding the reduced the pre-etch-back value of Hc, it was useful as a further test on capping material selection. As shown in FIG. 2, after etch-back Hc for Sample 2 deteriorated completely in a similar manner to Sample 1. Details for FIG. 2 are MH curves, as follows 2(a) prior to etch-back;
2(b) after ion beam etching (IBE) removal of 30 Å FePt;
2(c) after IBE removal of 60 Å FePt;
2(d) after IBE removal of 90 Å FePt; and
2(e) after IBE removal of 120 Å FePt.

This data made it clear that a Ru layer does not offer significant protection from ion beam damage during etch-back so additional materials needed to be investigated as possible candidates for protecting FePt during ion beam etching.

Figure 3:
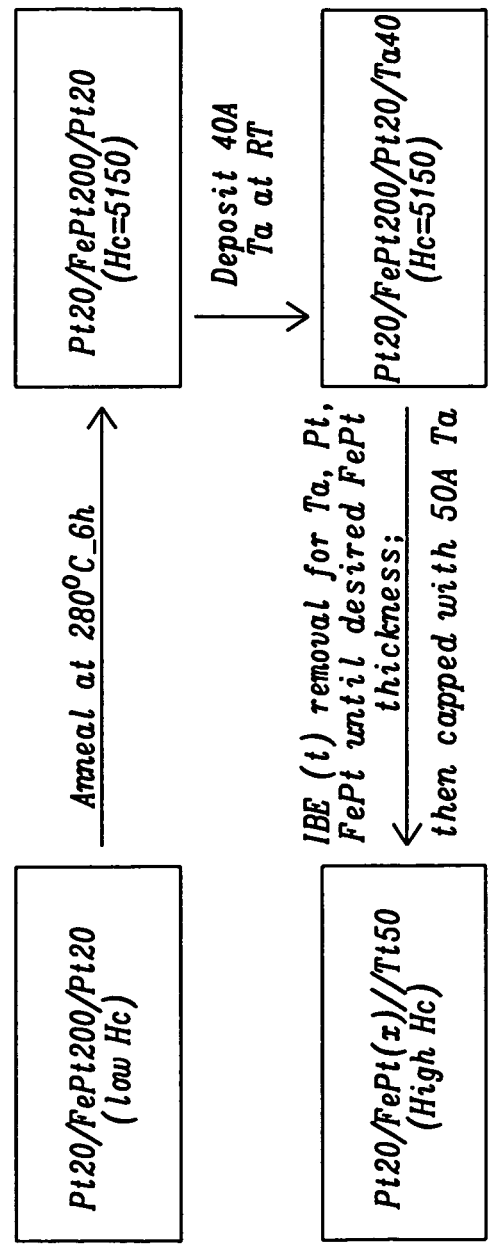
FIG. 3 is a flow diagram for the process of the invention.
Figure 4:
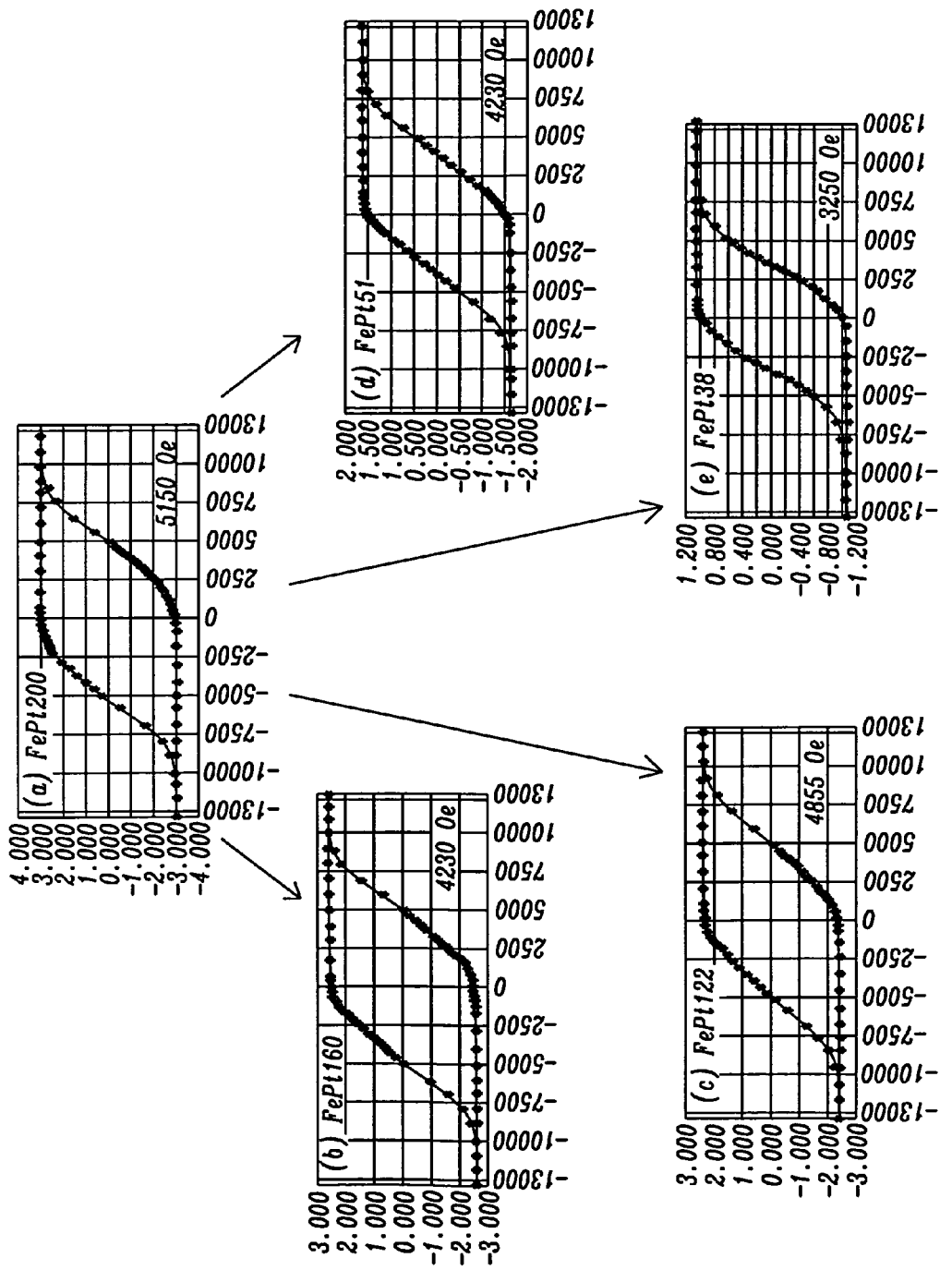
FIG. 4 shows how a FePt film that was protected with 40 Å of Ta prior to starting etch-back can be thinned down to as low as 38 Å with a Hc as high as 3,250 Oe.

In sample 3 the 40 Å layer of Ru was replaced by an ion beam protection layer (IBPL) comprising a 40 Å layer of Ta, giving Sample 3 a (Pt20/FePt200/Pt20/Ta40) structure. This yielded much more encouraging results. The procedure followed for Sample 3 is summarized in flow chart form in FIG. 3 while the results are displayed in FIG. 4 as follows:

4(a) Prior to etch-back; 200 Å of FePt remaining; Hc=5150 Oe

4(b) After etch-back; 160 Å of FePt remaining; Hc=4791 Oe

4(c) After etch-back; 122 Å of FePt remaining; Hc=4855 Oe

4(d) After etch-back; 51 Å of FePt remaining; Hc=4230 Oe

4(e) After etch-back; 38 Å of FePt remaining; Hc=3250 Oe

The process used with Sample 3 constituted a first embodiment of the invention. It is a matter of designer's choice whether deposition of the IBPL, in this case a 40 Å layer of Ta, and performance of the etch back process are implemented in the same system or in separate systems. However, regardless of what choice was made, it is clear that providing an IBPL, such as Ta, prior to initiating etch back is critical to retaining an ordered FePt structure during ion beam etching.

Embodiment 2

Figure 5:
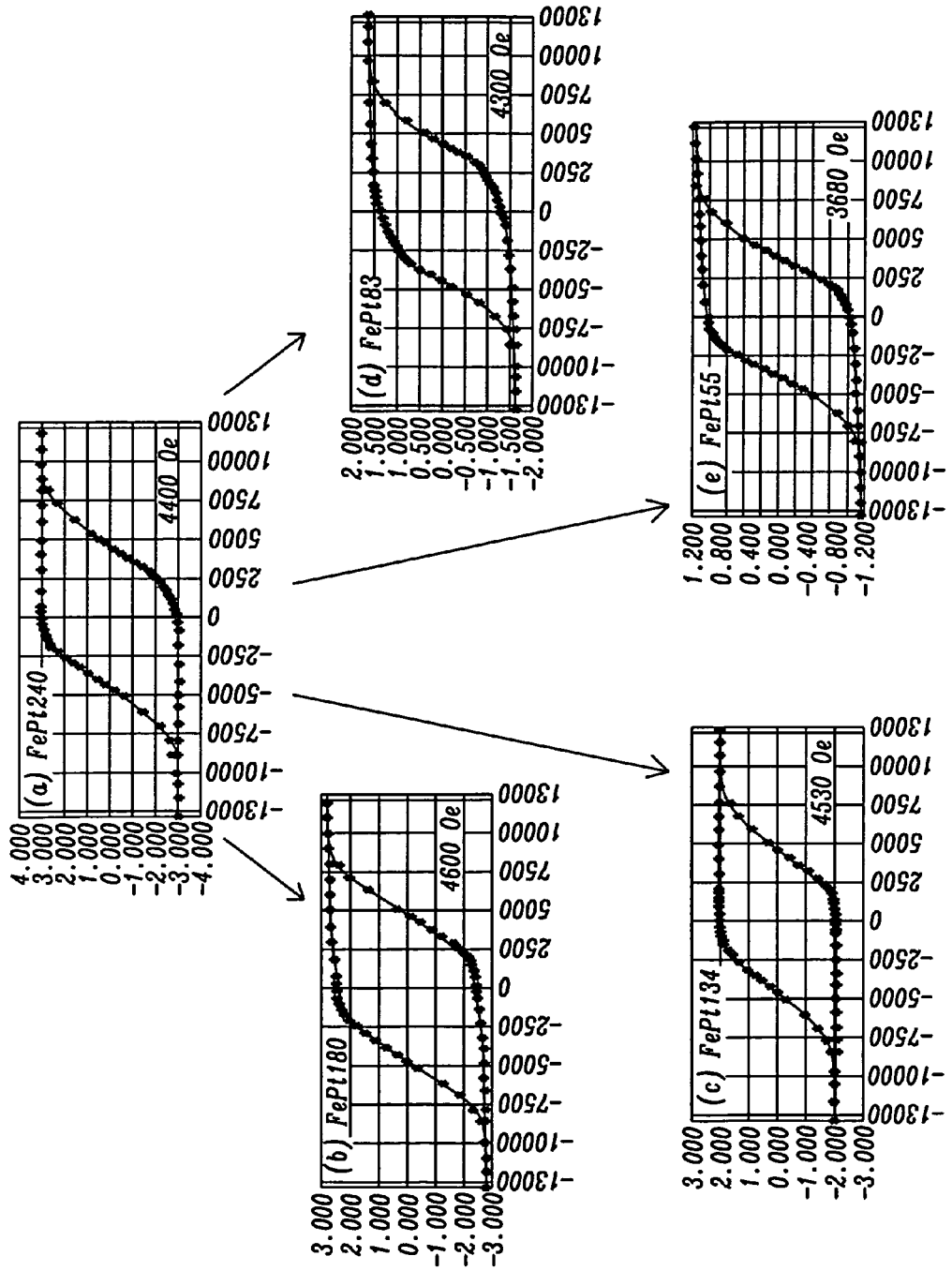
FIG. 5. Shows MH curves after etch back processes associated with the second embodiment of the invention

As an alternative to pure Ta, the IBPL could comprise a bilayer of Ta and a second material selected from the group consisting of Cu, Ru, Rh, NiCr, Hf, and their alloys or the IBPL could comprise a bilayer of either Hf or NiCr together with a second material selected from the group consisting of Cu, Ru, Rh, NiCr, Ta, and their alloys. MH curves in which a Ru20/Ta40 IBPL was used are shown in FIG. 5. Details are as follows:

5(a) Prior to etch-back; 240 Å of FePt remaining; Hc=4400 Oe

5(b) After etch-back; 180 Å of FePt remaining; Hc=4600 Oe

5(c) After etch-back; 134 Å of FePt remaining; Hc=4530 Oe

5(d) After etch-back; 83 Å of FePt remaining; Hc=4300 Oe

5(e) After etch-back; 55 Å of FePt remaining; Hc=3680 Oe

Although we have been unable to provide a satisfactory explanation for the foregoing results (which, as noted above, were largely unexpected) we did amass the following additional information related to the basic process:

a. A low power ion beam etch is preferred, for example, power ranges from 50 w to 300 w, with Ar flow from 3 sccm to 15 sccm. Our preferred thickness for an IBPL of pure Ta was 30 to 50 Å layer thickness but a range of from 20A to 100 Å still provided acceptable results. When a Ru/Ta IBPL was used, the preferred thickness range for the Ru portion was 20 to 50 Å and 20 to 100 Å for the Ta portion.

b. The invention was found to produce comparable results (to those detailed above for FePt) in other high Hc magnetic thin films such as CoPt c. For both CoPt and FePt having either in-plane or perpendicular-to-plane anisotropy.

d. High Hc(>4000 Oe) and high Hk (>1 Tesla) has been achieved even with a 70 Å thick FePt film

What is claimed is:

1. A process to form a magnetic film having, simultaneously, both a low thickness and a high coercivity, comprising:
depositing a first layer of platinum on a substrate;
depositing said magnetic film on said first layer of platinum;
depositing a second layer of platinum on said magnetic film;
depositing an ion beam protection layer (IBPL) on said second layer of platinum thereby forming a base sample;
annealing said base sample at a temperature of at least 250° C. for at least 4 hours whereby said magnetic film acquires a coercivity at least as great as said high coercivity, wherein said high coercivity is at least 3250 Oe; and
then, through use of an ion beam, etching back said base sample until said magnetic film has attained said low thickness together with said high coercivity, wherein said low thickness is between 30 and 85 Å, and wherein said etching back removes said ion beam protection layer, said second layer of platinum, and a portion of said magnetic film to obtain said low thickness.

2. The process recited in claim 1 wherein said low thickness is between 30 and 50 Å and said high coercivity is at least 3,680 Oe.

3. The process recited in claim 1 wherein said low thickness is between 80 and 85 Å and said high coercivity is at least 4,300 Oe.

4. The process recited in claim 1 wherein said low thickness is between 38 and 83 Å and said high coercivity is between 3,250 and 4,300 Oe.

5. The process recited in claim 1 wherein said IBPL is a layer of tantalum having a thickness in a range of from 20 Å to 100 Å.

6. The process recited in claim 1 wherein said IBPL is a layer of tantalum having a thickness in a range of from 30 to 50 Å.

7. The process recited in claim 1 wherein said magnetic film is selected from the group consisting of CoPt and FePt.

8. The process recited in claim 7 wherein either member of said group may have in-plane magnetic anisotropy or perpendicular-to-plane magnetic anisotropy.

9. The process recited in claim 1 wherein said ion beam, used for etching back said base sample, operates within a power range of from 50 w to 300 w, with an Ar flow of from 3 sccm to 15 sccm.

10. The process recited in claim 1 wherein said IBPL is a bilayer of 20 to 50 Å of Ru on 20 to 100 Å of Ta.

11. The process recited in claim 10 wherein said low thickness is no greater than 55 Å and said high coercivity is at least 3,680 Oe.

12. The process recited in claim 10 wherein said low thickness is no greater than 83 Å and said high coercivity is at least 4,300 Oe.

13. The process recited in claim 10 wherein said low thickness is between 55 and 134 Å and said high coercivity is between 3,680 and 4,530 Oe.

14. The process recited in claim 10 wherein said ion beam, used for etching back said base sample, operates within a power range of from 50 w to 300 w, with an Ar flow of from 3 sccm to 15 sccm.

15. The process recited in claim 1 wherein said magnetic film is selected from the group consisting of CoPt and FePt.

16. The process recited in claim 15 wherein either member of said group may have in-plane magnetic anisotropy or perpendicular-to-plane magnetic anisotropy.

17. The process recited in claim 1 wherein said IBPL is a bilayer of Ta and a second material selected from the group consisting of Cu, Rh, NiCr, Hf, and their alloys.

18. The process recited in claim 1 wherein said IBPL is a bilayer of either Hf or NiCr and a second material selected from the group consisting of Cu, Ru, Rh, NiCr, Ta, and their alloys.

* * * * *